(No Model.)
J. GIBBINS.
FRICTION CLUTCH.
No. 284,731. Patented Sept. 11, 1883.
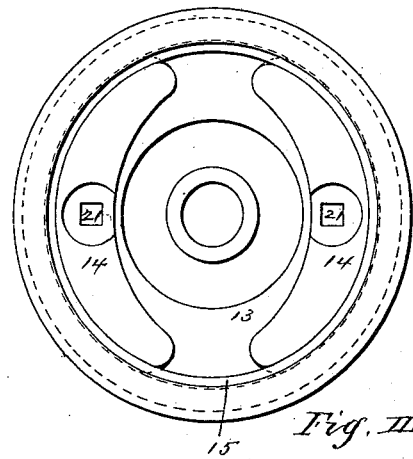
Fig. III.
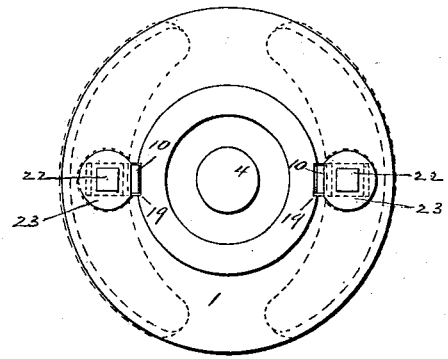
Fig. IV.
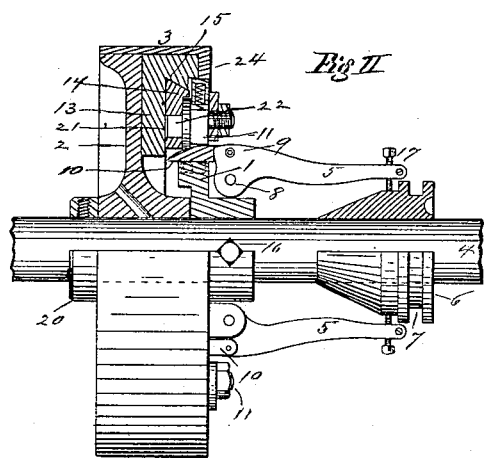
Fig. II.
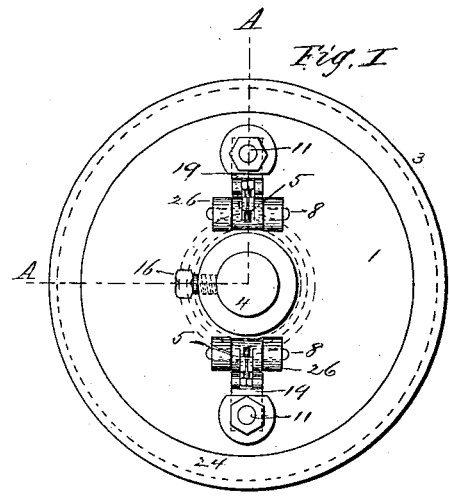
Fig. I.
Witnesses.
N. E. Dwinnell.
Chas. H. Wood.
Inventor.
James Gibbins.
By T. A. Curtis,
his atty.

UNITED STATES PATENT OFFICE.

JAMES GIBBINS, OF SPRINGFIELD, MASSACHUSETTS.

FRICTION-CLUTCH.

SPECIFICATION forming part of Letters Patent No. 284,731, dated September 11, 1883.

Application filed July 10, 1882. (No model.)

*To all whom it may concern:*

Be it known that I, JAMES GIBBINS, of Springfield, in the county of Hampden and State of Massachusetts, have invented a new and useful Improvement in Friction-Clutches, of which the following is a specification and description.

The object of my invention is to provide a friction-clutch which shall be simple and effective in its operation, and in which the greatest amount of friction is produced to render the clutch operative as compared with the amount of friction-surface exposed, and which may be easily repaired when required; and I accomplish this by the mechanism and construction, substantially as hereinafter described, and illustrated in the accompanying drawings, in which—

Figure I is a front view of a friction-clutch made according to my invention and applied to a pulley. Fig. II is a half-elevation and a half-section of the same at line A of Fig. I. Fig. III is a front view of the loose portion of the clutch, and with the friction-bed exposed therein and the shoes in place thereon; and Fig. IV is a rear view of the plate to which the mechanism is secured which moves the shoes against the friction-bed to operate the loose pulley.

In the drawings, 1 represents a plate or disk, of circular form, and provided with a hub, through which is turned a set-screw, as 16, by which the plate is secured to the shaft, and in this plate are made radial slots, as 4, as 19, into each of which is fitted to slide freely therein a gib, as 11, preferably of rectangular form, to fit the slot properly, with a shoulder on the inside to bear against the inside of the plate, and with a threaded projection on the outer end and a nut and washer thereon to hold it in place; and a projection or lug, as 22, is made on the inner end of the gib, which engages in a hole, as 21, in a shoe, as 14. (Shown in Fig. III.)

2 represents a loose pulley, adapted to run on the shaft 4, and to its inner face is secured the friction-bed, as 13, which may be made of paper, wood, or other suitable material, and which is provided with an annular flange projecting from its face, which flange is beveled inward, as shown clearly at 15 in Fig. II, and the outer rim of each shoe is correspondingly beveled to fit this annular bevel in the friction-bed. The rim, as 3, of the pulley may be cast integral with its main portion, or it may be secured by brazing or by any convenient means; and the rim, as 3, may be provided with an overhanging flange, as 24, projecting inward all around, and with a screw-thread on its periphery, to screw it into the rim 3, which is threaded for that purpose. When the pulley is moved up into place, its hub strikes against the inner face of the plate 1, and is held there by a collar, as 20, placed against the opposite end of the hub, and a set-screw turned through said collar, and when so placed the plate, as 1, has the appearance of forming one side of the pulley, and may just fit within the overhanging flange 24. Two ears, as 26, are made on the outer face of the plate 1 at the inner end of each radial slot, between which is pivoted, at 8, a lever, as 5, to each of which is pivoted, at 9, a wedge, as 10, which projects through the radial slot, and has a bearing against the inner end of said slot, and the gib, as 11, or the shoulder of the gib behind the plate 1 bears against the outer surface of the said wedge, and may be held in constant contact therewith by a spring, as 12, placed in the plate and against the outside of the gib, to hold the latter against the wedge. An ordinary grooved cone, as 6, is arranged to slide to and fro and to revolve on the shaft, and the levers are each provided with an adjusting-screw, as 17, the ends of which ride on the inclined portion of the cone as the latter is moved to and fro on the shaft. As the cone is moved toward the pulley the outer ends of the levers, as 5, or the adjusting-screws therein, ride up the incline of the cone into the position shown in Fig. II, and the wedge pivoted to each said lever, as 5, is forced into its slot between its inner end and the gib 11, and forcing the latter outward, and as the lug, as 22, on the gib engages in its hole 21 with the shoe, as 14, the latter is forced outward with its beveled rim against the beveled portion of the friction-bed, at 15, and also backward with its flat back against the flat portion of the friction-bed. This backward movement of the shoe against the flat portion of the friction-bed is caused by its beveled rim being forced against and sliding upon the beveled portion of the friction-bed, the outward radial movement of the shoe being also converted into a movement in a direction parallel with the shaft, and toward the friction-bed by the outward movement of the shoe by the gib and its lug, and the beveled edge of the shoe sliding against the beveled part of the friction-bed. As the plate, as 1, is firmly secured to the shaft, and revolves with it, the pulley, together with the friction-bed and the rim 3, secured thereto, is made to revolve with said plate by this movement of the shoes 14, and a belt extending around the face or rim 3 of this pulley, and also around another pulley on a counter-shaft, or around a pulley on a machine, will revolve said pulley and operate the machine. When the cone is moved away from the plate, the spring 12 will force the gib inward and the wedge outward, and cause the outer ends of the levers to ride down the incline of the cone, and the pressure of the shoes against the friction-bed will be released, and the rotary movement of the pulley will cease.

If at any time the flat surface of the friction-bed or its beveled rim should become injured, they may be easily repaired by turning them off in a lathe.

It will be perceived that a friction-clutch made according to my invention is very effective, is cheap, is not liable to get out of order, may be easily repaired, and may be applied to a great variety of uses in connection with machinery, such as cut-off couplings, &c.

If desired, a small roll may be placed just inside the wedge, as 10, upon which the wedge may roll to and fro, by which much of the friction in the movement of the wedge will be removed.

It will be seen that the friction-bed in the pulley is of dovetailed form in its cross-section, and that each shoe is correspondingly shaped, so that when each shoe is forced outward in a direction at right angles to the shaft the contact of its beveled edge with the inwardly-inclined rim of the friction-bed forces the shoe also backward against the flat portion of the friction-bed, and this friction of the flat side of the shoe against the flat part of the friction-bed is increased or diminished according as the shoe is moved directly outward with greater or less force.

It will also be seen that in this construction of friction-clutch the pulley is held in the same vertical position upon the shaft, upon which it is free to revolve, by the collar 20, secured to the shaft upon one side of and against its hub, and by the plate 1, also secured to the shaft upon the other side of and against its hub, so that the pulley while revolving always remains in the same vertical position, and the shoes are the only part of the friction mechanism which moves in a direction lengthwise the shaft. This construction, as shown in my device, renders the clutch more positive and prompt in its action, owing to the rigid position of these portions of the pulley.

It will be seen that the friction-surface of the beveled rim is entirely within the pulley itself, and is protected from injury by the plate 1, located and secured outside of the friction-shoes, and of all the friction-surfaces, which prevents the entrance of dirt and foreign substances between said surfaces.

Having thus described my invention, what I claim as new is—

The combination of the pulley 2, secured upon a shaft to revolve freely thereon in the same vertical position between two fixed shoulders, a friction-bed having a beveled friction-rim and secured firmly to said pulley, a plate fitted to one side of said pulley outside of the friction-surfaces, and secured to the shaft, friction-shoes located inside of said plate, each having a beveled rim and fitted to and adapted to be moved radially against said friction-bed, actuating-levers 5, pivoted in said plate, the wedges 10, pivoted to said levers, a gib, 11, to engage with each shoe to move it radially, and a cone adapted to slide on the shaft to operate said levers, substantially as described.

JAMES GIBBINS.

Witnesses:
T. A. CURTIS,
N. E. DWINNELL.